United States Patent [19]
Raith et al.

[11] Patent Number: 5,734,645
[45] Date of Patent: Mar. 31, 1998

[54] LAYER 2 PROTOCOL IN A CELLULAR COMMUNICATION SYSTEM

[75] Inventors: A. Krister Raith, Durham; John Diachina, Garner, both of N.C.; Bengt Persson, Djursholm, Sweden; Anthony Sammarco, Garner, N.C.; Anders Hoff, Hägersten, Sweden

[73] Assignee: Telefonaktiebolaget LM Ericsson, Stockholm, Sweden

[21] Appl. No.: 331,816

[22] Filed: Oct. 31, 1994

Related U.S. Application Data

[63] Continuation-in-part of Ser. No. 147,254, Nov. 1, 1993, Pat. No. 5,603,081.

[51] Int. Cl.[6] ............................................. H04J 3/16
[52] U.S. Cl. ................................. 370/329; 455/33.1
[58] Field of Search ............................ 370/95.1, 95.3, 370/85.7, 110.1, 82, 83, 321, 329, 337, 341, 347; 455/33.1, 33.2, 34.1, 34.2, 54.1, 54.2; 379/59, 60; 395/185.01, 185.02; 371/30

[56] References Cited

U.S. PATENT DOCUMENTS

| | | | |
|---|---|---|---|
| 4,736,371 | 4/1988 | Tejima et al. | 370/95 |
| 4,797,654 | 1/1989 | Young et al. | 341/50 |
| 4,845,491 | 7/1989 | Fascenda et al. | 340/825.44 |
| 4,891,813 | 1/1990 | Salcedo et al. | |
| 5,012,469 | 4/1991 | Sardana | 370/95.3 |
| 5,153,902 | 10/1992 | Buhl et al. | 379/57 |
| 5,166,929 | 11/1992 | Lo | 370/85.3 |
| 5,172,375 | 12/1992 | Kou | 370/95.3 |
| 5,214,789 | 5/1993 | George | 455/33.2 |
| 5,226,040 | 7/1993 | Noble, III et al. | 370/56 |
| 5,235,592 | 8/1993 | Cheng et al. | 370/85.4 |
| 5,353,332 | 10/1994 | Raith et al. | 379/59 |
| 5,373,506 | 12/1994 | Tayloe et al. | |
| 5,404,355 | 4/1995 | Raith et al. | 370/95.1 |
| 5,483,532 | 1/1996 | Eriksson | 370/94.2 |

FOREIGN PATENT DOCUMENTS

| | | |
|---|---|---|
| 2060428-0 | 8/1992 | Canada. |
| 321 454 | 6/1989 | European Pat. Off.. |
| 336 079 | 10/1989 | European Pat. Off.. |
| 370 829 | 5/1990 | European Pat. Off.. |

OTHER PUBLICATIONS

Onoe et al., "Radio Link Control Techniques for Digital Cellular Systems," *NTT Review*, vol. 4, No. 1, pp. 47–54, Jan. 1992.

Kobayashi et al., "TDMA Radio Link Control Techniques and Development of a Digital Cellular System,"*IEICE Transactions on Fundamentals of Electronics, Communications and Computer Sciences*, vol. E75–A, No. 12, pp. 1619–1624, Dec. 1992.

PCT International Search Report regarding PCT/US94/12615 Date of mailing: 14 Mar. 1995.

John D. Spragins et al., "*Telecommunications Protocol and Design*", pp. 323–327, Feb. 1991.

"A New Standard for North American Digital Cellular", Magnus Isaksson et al., *Ericsson Review*, No. 2, pp. 58–69 (1994).

"Cellular System Dual–Mode Mobile Station—Base Station Compatibility Standard", *EIA/TIA Interim Standard*, IS–54–B, pp. 101–106; 109–116; 139–140; and 163–166 (Apr., 1992).

*Primary Examiner*—Douglas W. Olms
*Assistant Examiner*—Ajit Patel
*Attorney, Agent, or Firm*—Burns, Doane, Swecker & Mathis, L.L.P.

[57] ABSTRACT

A method for transmitting messages using an efficient communications link protocol over an air interface of a cellular communications system is disclosed. A frame in the protocol is divided into a plurality of sections including a header section and a data section. The header section contains a field which indicates what type of information is contained in the frame.

3 Claims, 8 Drawing Sheets

F = F-BCCH
E = E-BCCH
S = S-BCCH
SPACH = PCH OR ARCH OR SMSCH

| BU =XXX | PCON =X | BCN =X | PFM =X | SMSN =X |
|---|---|---|---|---|
| 3 | 1 | 1 | 1 | 1 |

FIG. 10b

| BT =XXX | IDT =XX | MM =X | OI =X |
|---|---|---|---|
| 3 | 2 | 1 | 1 |

FIG. 10c

| HEADER A (BU=111) | GA =X | FILLER =0..0 | CRC =X..X |
|---|---|---|---|
| 7 | 1 | 101 | 16 |

FIG. 10d

| HEADER A (BU=000) | MSID1 =X..X | MSID2 =X..X | MSID3 =X..X | CRC =X..X |
|---|---|---|---|---|
| 7 | 34 | 34 | 34 | 16 |

FIG. 10e

| HEADER A (BU=001) | IDT =01 | MSID1 =X..X | MSID2 =X..X | MSID3 =X..X | MSID4 =X..X | FILLER =0..0 | CRC =X..X |
|---|---|---|---|---|---|---|---|
| 7 | 2 | 24 | 24 | 24 | 24 | 4 | 16 |

FIG. 10f

| HEADER A (BU=010) | HEADER B (BT=000) | MSID1 =X..X | L3LI1 =X..X | L3DATA1 =X..X | FILLER =0..0 | CRC =X..X |
|---|---|---|---|---|---|---|
| 7 | 7 | | 8 | | | 16 |

FIG. 10g

| HEADER A (BU=011) | HEADER B (BT=001) | MSID1 =X..X | MSID2 =X..X | L3LI1 =X..X | L3LI2 =X..X | L3DATA1 =X..X | L3DATA2 =X..X | FILLER =0..0 | CRC =X..X |
|---|---|---|---|---|---|---|---|---|---|
| 7 | 7 | | | 8 | 8 | | | | 16 |

FIG. 10h

| HEADER A (BU=011) | HEADER B (BT=001) | MSID1 =X..X | MSID2 =X..X | L3LI1 =X..X | L3LI2 =X..X | L3DATA1 =X..X | CRC =X..X |
|---|---|---|---|---|---|---|---|
| 7 | 7 | | | 8 | 8 | | 16 |

FIG. 10i

| HEADER A (BU=011) | HEADER B (BT=100) | L3DATA1 =X..X | L3DATA2 =X..X | FILLER =0..0 | CRC =X..X |
|---|---|---|---|---|---|
| 7 | 7 | | | | 16 |

FIG. 10j

| HEADER A (BU=011) | HEADER B (BT=000, OI=1) | MSID1 =X..X | L3LI1 =X..X | CLI =X..X | L3DATA0 =X..X | L3DATA1 =X..X | CRC =X..X |
|---|---|---|---|---|---|---|---|
| 7 | 7 | | 8 | 7 | | | 16 |

FIG. 10k

| HEADER A (BU=011) | HEADER B (BT=010, MM=1) | MSID1 =X..X | MSID2 =X..X | MSID3 =X..X | L3LI1 =X..X | L3DATA1 =X..X | CRC =X..X |
|---|---|---|---|---|---|---|---|
| 7 | 7 | | | | 8 | | 16 |

FIG. 10l

| HEADER A (BU=011) | HEADER B (BT=100) | L3DATA1 =X..X | RSVD =0..0 | FILLER =0..0 | CRC =X..X |
|---|---|---|---|---|---|
| 7 | 7 | | | | 16 |

FIG. 10m

| HEADER A (BU=100) | HEADER B (BT=101) | MSID1 =X..X | PE =X..X | TID =X..X | L3LI1 =X..X | L3DATA1 =X..X | CRC =X..X |
|---|---|---|---|---|---|---|---|
| 7 | 7 | 7 | 2 | | 8 | | 16 |

FIG. 10n

| HEADER A (BU=100) | HEADER B (BT=110) | PE =X..X | TID =X..X | FRNO =X..X | L3DATA1 =X..X | CRC =X..X |
|---|---|---|---|---|---|---|
| 7 | 7 | 7 | 2 | 5 | | 16 |

FIG. 10o

| HEADER A (BU=010) | HEADER B (BT=111) | GID1 =X..X | L3LI =X..X | L3DATA1 =X..X | FILLER =0..0 | CRC =X..X |
|---|---|---|---|---|---|---|
| 7 | 7 | | 8 | | | 16 |

LAYER 2 PROTOCOL IN A CELLULAR COMMUNICATION SYSTEM

This application is a continuation in part of U.S. patent application Ser. No. 08/147,254, entitled "A Method for Communicating in a Wireless Communication System," which was filed on Nov. 1, 1993, now U.S. Pat. No. 5,603,081, and which is incorporated in this application by reference.

BACKGROUND

The present invention relates to a method for transmitting messages between mobile stations and a central switching system, and more particularly to a method for transmitting these messages using a more efficient communications link protocol over the air-interface of a cellular telephone system.

In a typical cellular radio system, a geographical area, e.g., a metropolitan area, is divided into several smaller, contiguous radio coverage areas called "cells." The cells are served by a series of fixed radio stations called "base stations." The base stations are connected to and controlled by a mobile services switching center (MSC). The MSC, in turn, is connected to the land-line (wire-line) public switched telephone network (PSTN). The telephone users (mobile subscribers) in the cellular radio system are provided with portable (hand-held), transportable (hand-carried) or mobile (car-mounted) telephone units (mobile stations) which communicate voice and/or data with the MSC through a nearby base station. The MSC switches calls between and among wire-line and mobile subscribers, controls signalling to the mobile stations, compiles billing statistics, and provides for the operation, maintenance and testing of the system.

Figure 1:
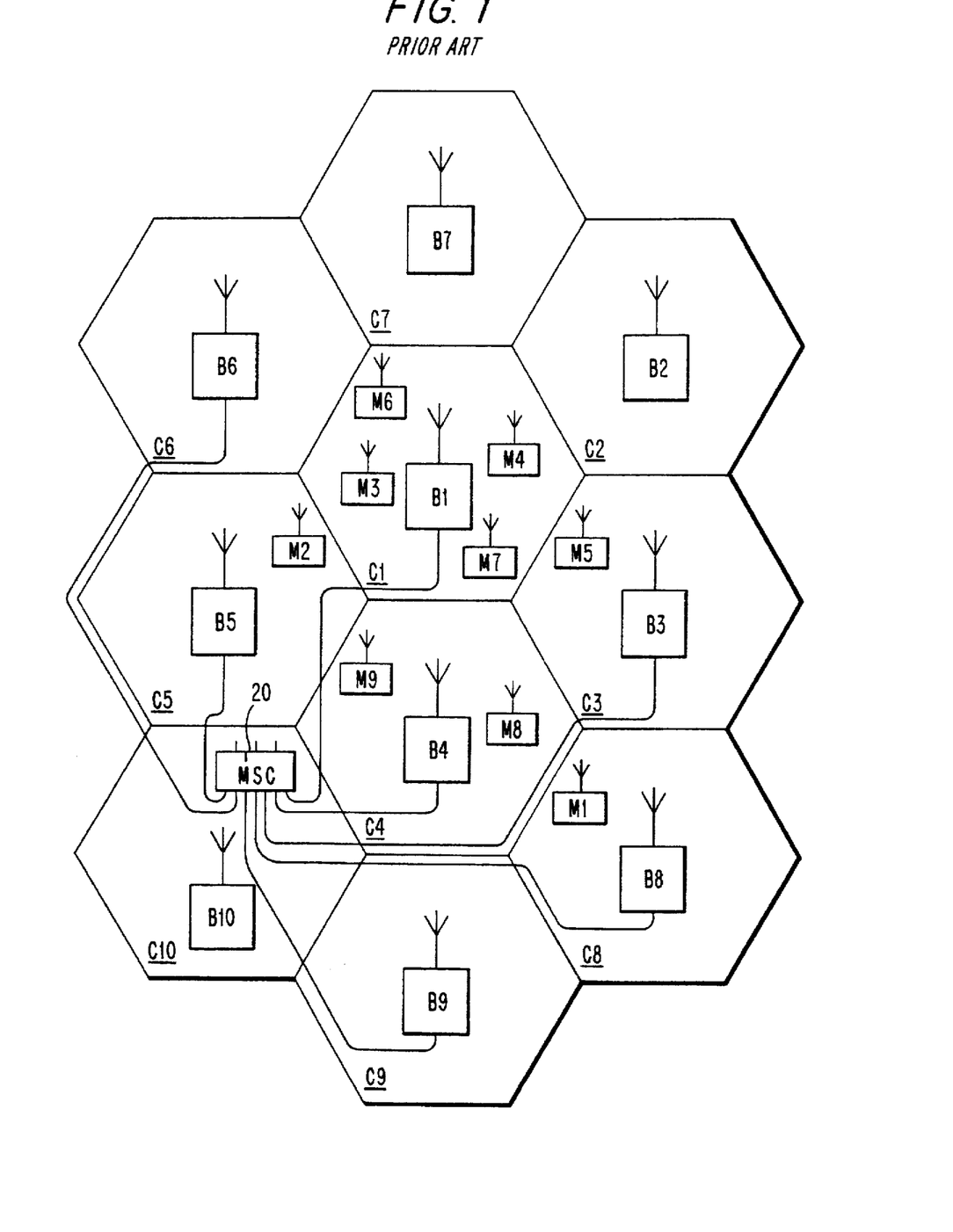
FIG. 1 shows the architecture of a conventional cellular radio system.

FIG. 1 illustrates the architecture of a conventional cellular radio system built according to the Advanced Mobile Phone Service (AMPS) standard. In FIG. 1, an arbitrary geographic area is divided into a plurality of contiguous radio coverage areas, or cells, C1–C10. While the system of FIG. 1 is, for illustration purposes, shown to include only ten cells, the number of cells may be much larger in practice. Associated with and located in each of the cells C1–C10 is a base station designated as a corresponding one of a plurality of base stations B1–B10. Each of the base stations B1–B10 includes a plurality of channel units, each comprising a transmitter, a receiver and a controller, as is well known in the art.

Figure 2:
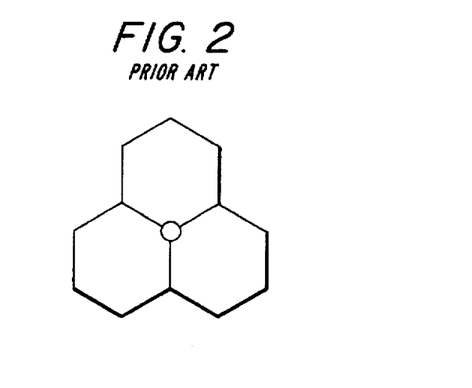
FIG. 2 shows a three sector cell which may be used in the system shown in FIG. 1.

In FIG. 1, the base stations B1–B10 are located at the center of the cells C1–C10, respectively, and are equipped with omni-directional antennas transmitting equally in all directions. In this case, all the channel units in each of the base stations B1–B10 are connected to one antenna. However, in other configurations of the cellular radio system, the base stations B1–B10 may be located near the periphery, or otherwise away from the centers of the cells C1–C10 and may illuminate the cells C1–C10 with radio signals directionally. For example, the base station may be equipped with three directional antennas, each one covering a 120-degree sector cell as shown in FIG. 2. In this case, some channel units will be connected to one antenna covering one sector cell, other channel units will be connected to another antenna covering another sector cell, and the remaining channel units will be connected to the remaining antenna covering the remaining sector cell. In FIG. 2, therefore, the base station serves three sector cells. However, it is not always necessary for three sector cells to exist and only one sector cell needs to be used to cover, for example, a road or a highway.

Returning to FIG. 1, each of the base stations B1–B10 is connected by voice and data links to an MSC 20 which is, in turn, connected to a central office (not shown) in the public switching telephone network (PSTN), or a similar facility, e.g., an integrated system digital network (ISDN). The relevant connections and transmission modes between the mobile switching center MSC 20 and the base stations B1–B10, or between the mobile switching center MSC 20 and the PSTN or ISDN, are well known to those of ordinary skill in the art and may include twisted wire pairs, coaxial cables, fiber optic cables or microwave radio channels operating in either analog or digital mode. Further, the voice and data links may either be provided by the operator or leased from a telephone company (telco).

With continuing reference to FIG. 1, a plurality of mobile stations M1–M9 may be found within the cells C1–C10. Again, while only nine mobile stations are shown in FIG. 1, the actual number of mobile stations may be much larger in practice and will generally exceed the number of base stations. Moreover, while none of the mobile stations M1–M9 may be found in some of the cells C1–C10, the presence or absence of the mobile stations M1–M9 in any particular one of the cells C1–C10 depends on the individual desires of each of the mobile subscribers who may travel from one location in a cell to another or from one cell to an adjacent or neighboring cell.

Each of the mobile stations M1–M9 includes a transmitter, a receiver, a controller and a user interface, e.g., a telephone handset, as is well known in the art. Each of the mobile stations M1–M9 is assigned a mobile identification number (MIN) which, in the United States, is a digital representation of the telephone directory number of the mobile subscriber. The MIN defines the subscription of the mobile subscriber on the radio path and is sent from the mobile station to the MSC 20 at call origination and from the MSC 20 to the mobile station at call termination. Each of the mobile stations M1–M9 is also identified by an electronic serial number (ESN) which is a factory-set, "unchangeable" number designed to protect against the unauthorized use of the mobile station. At call origination, for example, the mobile station will send the ESN to the MSC 20. The MSC 20 will compare the received ESN to a "blacklist" of the ESNs of mobile stations which have been reported to be stolen. If a match is found, the stolen mobile station will be denied access.

Each of the cells C1–C10 is allocated a subset of the radio frequency (RF) channels assigned to the entire cellular system by the concerned government authority, e.g., the Federal Communications Commission (FCC) in the United States. Each subset of RF channels is divided into several voice or speech channels which are used to carry voice conversations, and at least one paging/access or control channel which is used to carry supervisory data messages, between each of the base stations B1–B10 and the mobile stations M1–M9 in its coverage area. Each RF channel comprises a duplex channel (bi-directional radio transmission path) between the base station and the mobile station. The RF channel consists of a pair of separate frequencies, one for transmission by the base station (reception by the mobile station) and one for transmission by the mobile station (reception by the base station). Each channel unit in the base stations B1–B10 normally operates on a preselected one of the radio channels allocated to the corresponding cell, i.e., the transmitter (TX) and receiver (RX) of the channel unit are tuned to a pair of transmit and receive frequencies, respectively, which is not changed. The transceiver (TX/RX) of each mobile station M1–M9, however, may tune to any of the radio channels specified in the system.

In typical land-line systems, remote stations and control centers are connected by copper or fiber optic circuits which have a data throughput capacity and performance integrity that is generally significantly better than the data throughput capacity and performance integrity provided by an air interface in a cellular telephone system. As a result, the conciseness of overhead required to manage any selected communication link protocol for land-line systems is of secondary importance. In cellular telephone systems, an air interface communications link protocol is required in order to allow a mobile station to communicate with a cellular switching system. A communications link protocol is used to initiate and to receive cellular telephone calls.

The electromagnetic spectrum available for use by cellular telephone systems is limited and is portioned into units called channels. Individual channels are used as communication links either on a shared basis or on a dedicated or reserved basis. When individual channels are used as communication links on a shared basis, multiple mobile stations may either listen to or contend for the same channels. In the contending situation, each shared channel can be used by a plurality of mobile stations which compete to obtain exclusive use of the channel for a limited period of time. On the other hand, when individual channels are used as communication links on a dedicated basis, a single mobile station is assigned the exclusive use of the channel for as long as it needs it.

The continued need to serve existing analog-only mobile stations has led to the specification in IS-54B of an analog control channel (ACC) which has been inherited from the prior AMPS or the equivalent EIA/TIA-553 standard. According to EIA/TIA-553, the analog forward control channel (FOCC) on the down-link from the base station to the mobile stations carries a continuous data stream of messages (words) in the format shown in FIG. 3. Several different types (functional classes) of messages may be transmitted on the analog FOCC. These messages include a system parameter overhead message (SPOM), a global action overhead message (GAOM), a registration identification message (REGID), a mobile station control message, e.g., a paging message, and a control-filler message. The SPOM, GOAM and REGID are overhead messages which are intended for use by all mobile stations in the coverage area of the base station. Overhead messages are sent in a group called an overhead message train (OMT). The first message of each OMT must always be the SPOM which is transmitted every 0.8±0.3 seconds.

Figure 3:
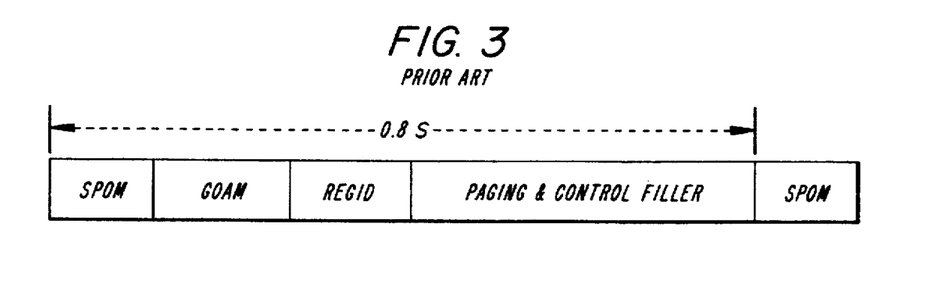
FIG. 3 shows the format of a forward analog control channel.

The format of the analog FOCC shown in FIG. 3 requires an idle mobile station listening to the FOCC to read all the messages transmitted in each OMT (not just paging messages) even though the information contained in these messages may not have changed from one OMT to the next OMT. This requirement tends to unnecessarily limit the mobile station battery life. One of the goals of the next generation digital cellular systems is to extend the "talk time" for the user, that is, the battery life of the mobile station. To this end, U.S. patent application Ser. No. 07/956,640 (which is incorporated here by reference) discloses a digital FOCC which can carry the types of messages specified for the analog FOCC, but in a format which allows an idle mobile station to read overhead messages when locking onto the FOCC and thereafter only when the information has changed, and to enter "sleep mode" at all other times. While in sleep mode, the mobile station turns off most internal circuitry and saves battery power.

Figure 4:
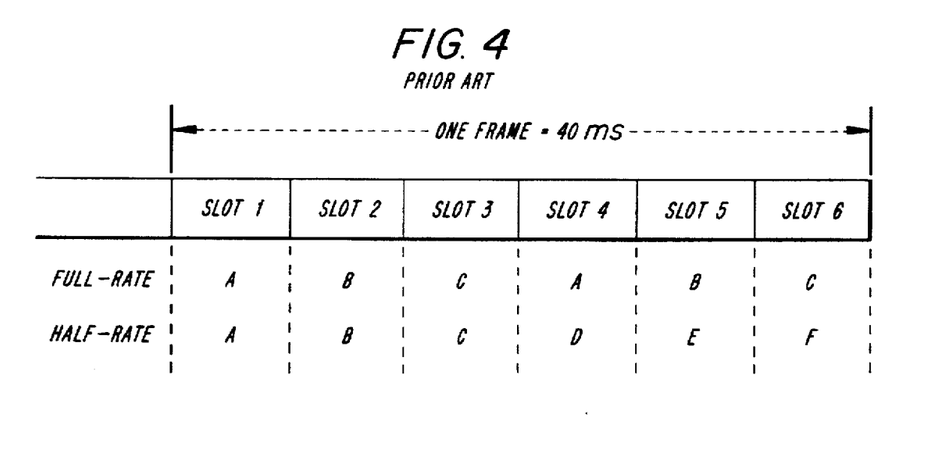
FIG. 4 shows the structure of a forward TDMA channel according to IS-54B.

The above-referenced U.S. patent application Ser. No. 07/956,640 shows how a digital control channel (DCC) may be defined alongside the digital traffic channels (DTC) specified in IS-54B. Referring to FIG. 4, a half-rate DCC would occupy one slot, while a full-rate DCC would occupy two slots, out of the six slots in each time-division-multiple-access (TDMA) frame of duration 40 milliseconds (msec). For additional DCC capacity, additional half-rate or full-rate DCCs may be defined in place of the DTCs until there are no more available slots on the carrier (DCCs may then be defined on another carrier if needed). Each IS-54B RF channel, therefore, can carry DTCs only, DCCs only, or a mixture of both DTCs and DCCs. Within the IS-54B framework, each RF channel can have up to three full-rate DTCs/DCCs, or six half-rate DTCs/DCCs, or any combination in-between, for example, one full-rate and four half-rate DTCs/DCCs.

Figure 5:
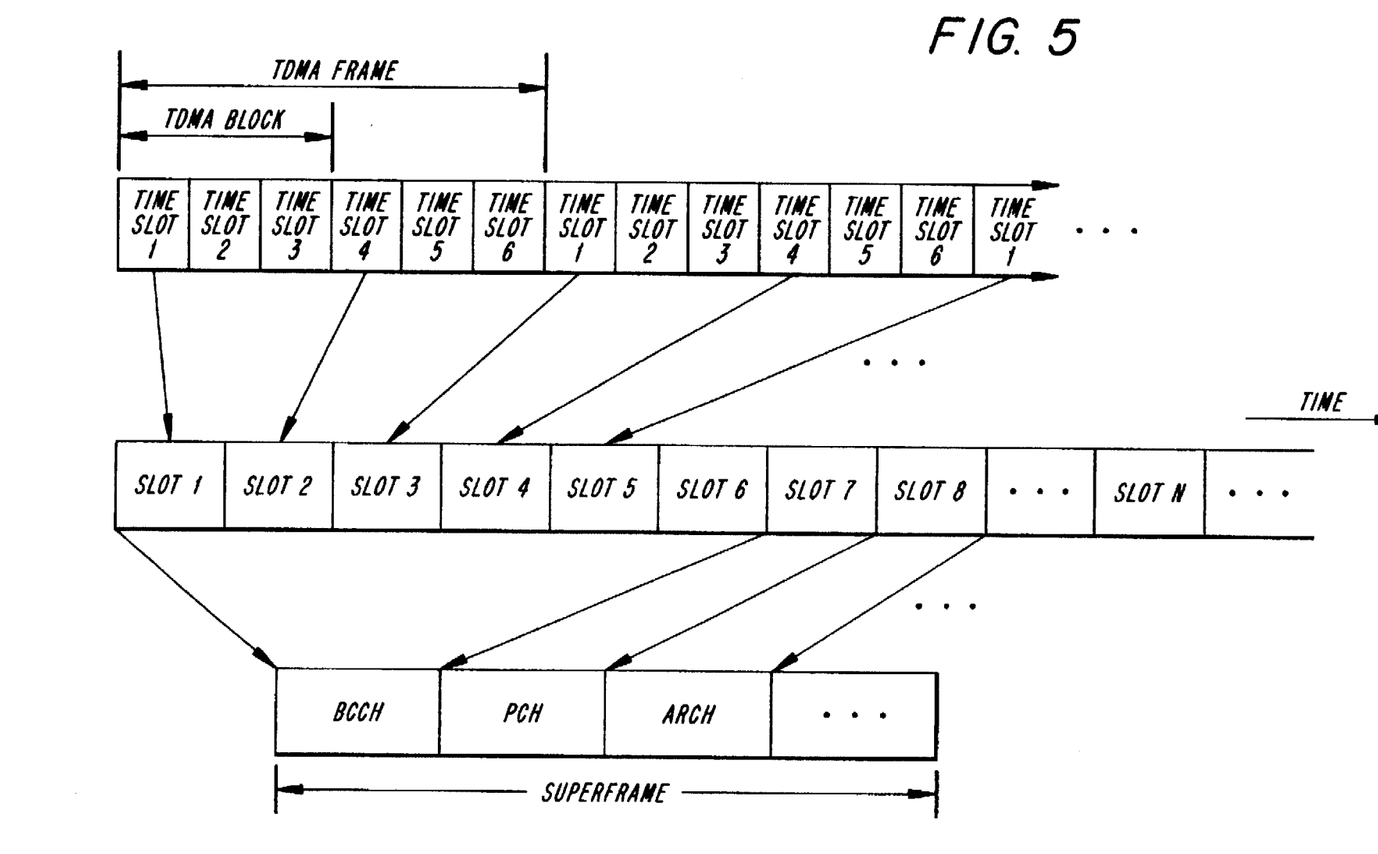
FIG. 5 is a generalized view of a digital control channel having time slots which are grouped into superframes.

In general, however, the transmission rate of the DCC need not coincide with the half-rate and full-rate specified in IS-54B, and the length of the DCC slots may not be uniform and may not coincide with the length of the DTC slots. FIG. 5 shows a general example of a forward (or downlink) DCC configured as a succession of time slots 1, 2, . . . , N, . . . included in the consecutive time slots 1, 2, . . . sent on a carrier frequency. These DCC slots may be defined on a radio channel such as that specified by IS-54B, and may consist, as seen in FIG. 5 for example, of every n-th slot in a series of consecutive slots. Each DCC slot has a duration that may or may not be 6.67 msec, which is the length of a DTC slot according to the IS-54B standard. (There are six DTC slots in each 40-msec TDMA frame.) Alternatively (and without limitation on other possible alternatives), these DCC slots may be defined in other ways known to one skilled in the art.

As shown in FIG. 5, the DCC slots may be organized into superframes and each superframe may include a number of logical channels that carry different kinds of information. One or more DCC slots may be allocated to each logical channel in the superframe. The exemplary downlink superframe in FIG. 5 includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 5 may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

For purposes of efficient sleep mode operation and fast cell selection, the BCCH may be divided into a number of sub-channels. U.S. patent application Ser. No. 07/956,640 discloses a BCCH structure that allows the mobile station to read a minimum amount of information when it is switched on (when it locks onto a DCC) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a layer 3 message as noted above. In the uplink direction, multiple mobile stations attempt to communicate with the system on a contention basis, while multiple mobile stations listen for layer 3 messages sent from the system in the downlink direction. In known systems, any given layer 3 message must be carried using as many TDMA channel bursts as required to send the entire layer 3 message.

The communication link protocol is commonly referred to as a layer 2 protocol within the communications industry and its functionality includes the limiting or framing of higher level messages. Traditional layer 2 protocol framing mechanisms or bit stuffing in flag characters are commonly used in land-line networks today to frame higher layer messages, which are referred to as layer 3 messages. These layer 3 messages may be sent between communicating layer 3 peer entities residing within mobile stations and cellular switching systems.

For a better understanding of the structure and operation of the present invention, the digital control channel DCC may be divided into three layers: layer 1 (physical layer), layer 2, and layer 3. The physical layer (L1) defines the parameters of the physical communications channel, e.g., RF spacing, modulation characteristics, etc. Layer 2 (L2) defines the techniques necessary for the accurate transmission of information within the constraints of the physical channel, e.g., error correction and detection, etc. Layer 3 (L3) defines the procedures for reception and processing of information transmitted over the physical channel.

Figure 6:
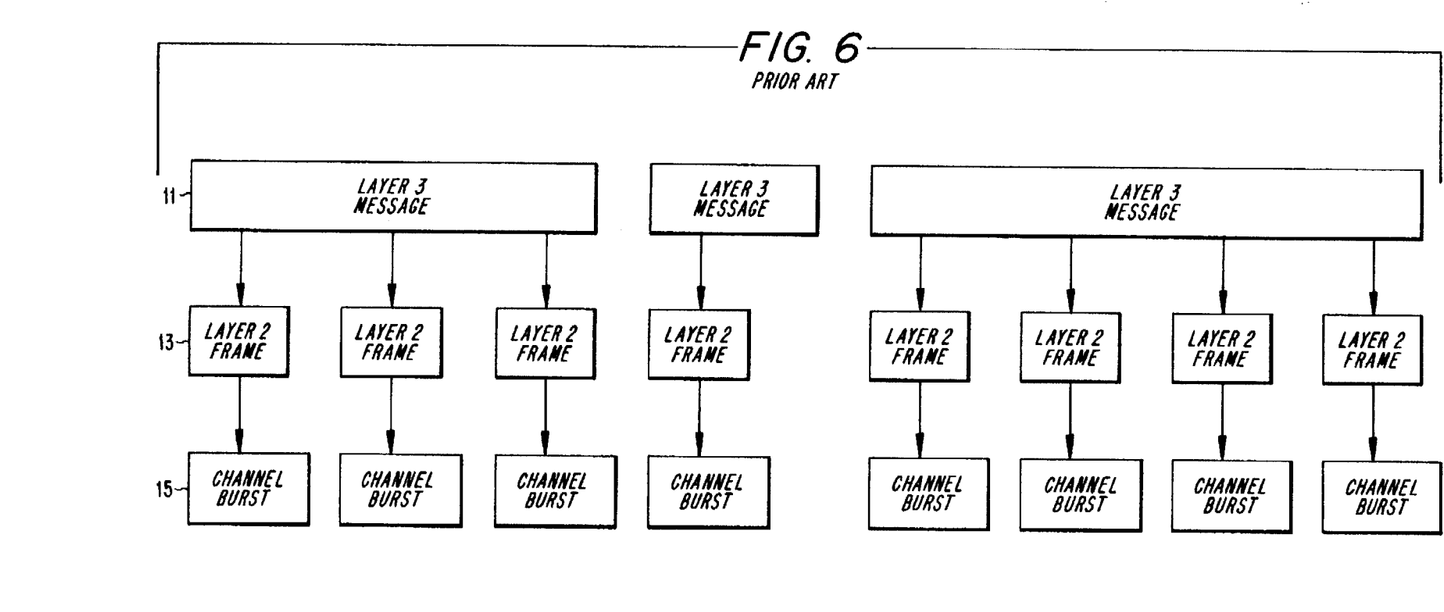
FIG. 6 illustrates a plurality of layer 3 messages, layer 2 frames, and layer 1 channel bursts in a communication system.

FIG. 6 schematically illustrates pluralities of layer 3 messages 11, layer 2 frames 13, and layer 1 channel bursts, or time slots, 15. In FIG. 6, each group of channel bursts corresponding to each layer 3 message may constitute a logical channel, and as described above, the channel bursts for a given layer 3 message would usually not be consecutive slots on an IS-54B carrier. On the other hand, the channel bursts could be consecutive; as soon as one time slot ends, the next time slot could begin.

Each layer 1 channel burst 15 contains a complete layer 2 frame as well as other information such as, for example, error correction information and other overhead information used for layer 1 operation. Each layer 2 frame contains at least a portion of a layer 3 message as well as overhead information used for layer 2 operation. Although not indicated in FIG. 6, each layer 3 message would include various information elements that can be considered the payload of the message, a header portion for identifying the respective message's type, and possibly padding.

Each layer 1 burst and each layer 2 frame is divided into a plurality of different fields. In particular, a limited-length DATA field in each layer 2 frame contains the layer 3 message 11. Since layer 3 messages have variable lengths depending upon the amount of information contained in the layer 3 message, a plurality of layer 2 frames may be needed for transmission of a single layer 3 message. As a result, a plurality of layer 1 channel bursts may also be needed to transmit the entire layer 3 message as there is a one-to-one correspondence between channel bursts and layer 2 frames.

As noted above, when more than one channel burst is required to send a layer 3 message, the several bursts are not usually consecutive bursts on the radio channel. Moreover, the several bursts are not even usually successive bursts devoted to the particular logical channel used for carrying the layer 3 message.

In light of the generally reduced data throughput capacity and performance integrity afforded by an individual channel in a channel sharing situation in a cellular telephone environment, the selection of an efficient air interface protocol to serve as the basis of the communication link becomes paramount.

Thus, there is a need for a layer 2 header which describes what is contained in the time slot, how it is contained in the time slot and how the information should be interpreted.

SUMMARY

It is an object of the present invention to provide an indication within the layer 2 protocol which indicates what is contained in a time slot, how it is contained in a time slot and how the information should be interpreted. According to one embodiment of the present invention, a method for transmitting information to a mobile station from a cellular switching system wherein a frame is divided into a plurality of sections including a header section and the header section is then coded so as to identify what is contained in the frame.

According to another embodiment of the present invention, a cellular communications system can page a mobile station using a SPACH Notification message. The SPACH Notification message asks the mobile station if it is able to receive a message and also indicates what type of message is going to be transmitted to the mobile station.

According to another embodiment of the present invention, a group identity field can be included in the SPACH layer 2 protocol. The group identity field indicates that a mobile is part of a group and enables the cellular communication system to page a plurality of mobiles with one page by including the group identity field in the SPACH layer 2 protocol. Furthermore, the SPACH layer 2 protocol can also include a go away flag which can be used to tell mobiles not to use a particular cell.

According to another embodiment of the present invention, a mobile station can distinguish between broadcast control channel BCCH slots and SPACH slots within a superframe. One way to distinguish between the different slots is to use a different cyclic redundancy check in the different type slots.

In yet another embodiment of the invention, a method for providing reserved channels in a layer 2 protocol in a cellular communication system includes the steps of providing a field in broadcast control channel overhead messages that indicates where reserved channels are located within a superframe.

According to another embodiment of the present invention, a group identity field (GID) can be included in the SPACH layer 2 protocol. The group identity field indicates that a mobile is part of a group. By using this group identity, the communication system can page the entire group using one page.

BRIEF DESCRIPTION OF THE DRAWINGS

The present invention will now be described in more detail with reference to preferred embodiments of the invention, given only by way of example, and illustrated in the accompanying drawings, in which.

DETAILED DESCRIPTION

Although the description hereinafter focuses on systems which comply with IS-54B, the principles of the present invention are equally applicable to a variety of wireless communication system, e.g., cellular and satellite radio system, irrespective of the particular mode of operation (analog, digital, dual-mode, etc.), the access technique (FDMA, TDMA, CDMA, hybrid FDMA/TDMA/CDMA, etc.), or the architecture (macrocells, microcells, picocells, etc.). As will be appreciated by one skilled in the art, the logical channel which carries speech and/or data may be implemented in different ways at the physical channel level (layer 1). The physical channel may be, for example, a relatively narrow RF band (FDMA), a time slot on a radio frequency (TDMA), a code sequence (CDMA), or a combination of the foregoing. For purposes of the present invention, the term "channel" means any physical channel which can carry speech and/or data, and is not limited to any particular mode of operation, access technique or system architecture.

This application contains subject matter which is related to U.S. Pat. No. 5,353,332 to Raith et al., entitled "Method and Apparatus for Communication Control in a Radiotelephone System"; to U.S. patent application Ser. No. 07/956,640, entitled "Digital Control Channel," filed on Oct. 5, 1992; to U.S. patent application Ser. No. 08/047,452, entitled "Layer 2 Protocol for the Random Access Channel and the Access Response Channel," filed on Apr. 19, 1993; to U.S. patent application Ser. No. 08/147,254, entitled "A Method for Communicating in a Wireless Communication System," filed on Nov. 1, 1993; to U.S. patent application Ser. No. 07/967,027, entitled "Multi-Mode Signal Processing," filed on Oct. 27, 1992; and to U.S. patent application Ser. No. 08/140,467 entitled "A Method of Effecting Random Access in a Mobile Radio System," filed on Oct. 25, 1993. These six co-pending applications are incorporated herein by reference.

Figure 7:
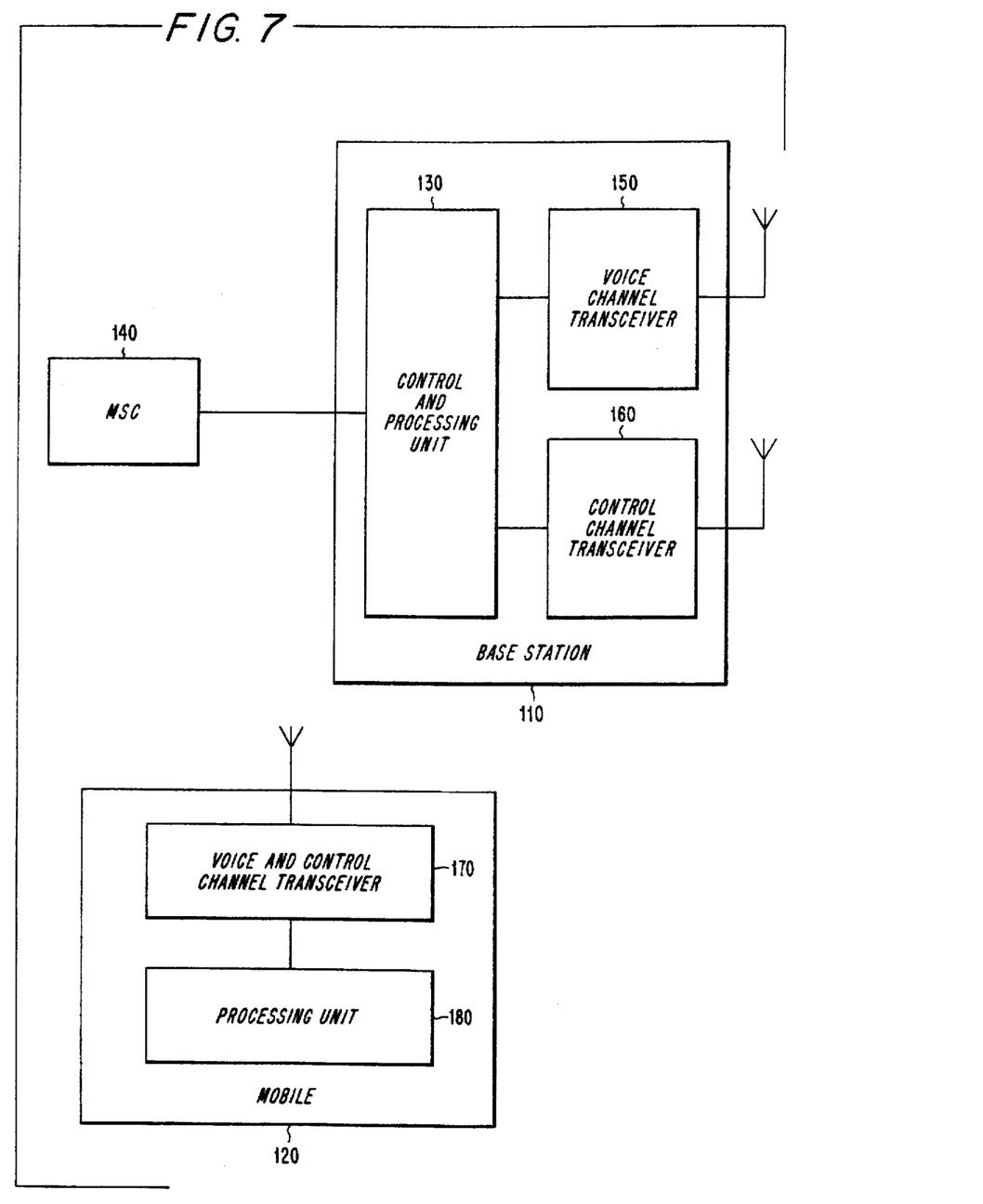
FIG. 7 illustrates a block diagram of an exemplary cellular mobile radio telephone system.

FIG. 7 represents a block diagram of an exemplary cellular mobile radiotelephone system according to one embodiment of the present invention. The system shows an exemplary base station 110 and a mobile station 120. The base station includes a control and processing unit 130 which is connected to the MSC 140 which in turn is connected to the PSTN (not illustrated). General aspects of such cellular radiotelephone systems are known in the art.

The base station 110 for a cell includes a plurality of voice channels handled by voice channel receiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel.

When the mobile 120 is in an idle mode, the mobile periodically scans the control channels of base stations like base station 110 to determine which cell to lock on or camp to. The mobile 120 receives absolute information (information about the particular cell corresponding to the control channel on which the information is being broadcast and may include the service profile of that cell, the control channel organization, and the type of cell) and relative information (generally the same kind of information as absolute information but is information concerning the characteristics of other cells) broadcast on a control channel at its voice and control channel transceiver 170. Then, the processing unit 180 evaluates the received control channel information which includes the characteristics of the candidate cells and determines which cell the mobile should lock onto. The received control channel information not only includes absolute information concerning the cell with which it is associated, but also contains relative information concerning other cells proximate to the cell which the control channel is associated.

Figure 8:
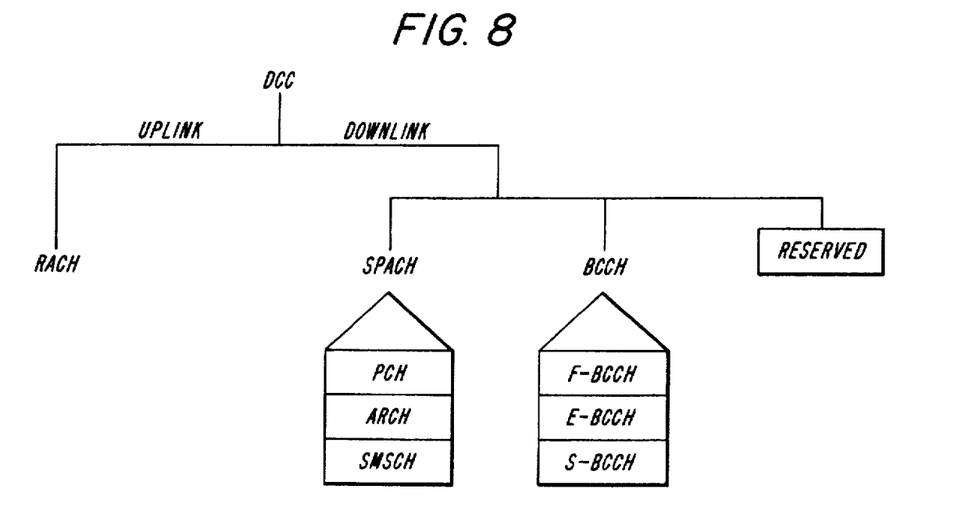
FIG. 8 illustrates the logical channels which make up the digital control channel according to one embodiment of the present invention.

According to the present invention, the digital control channel DCC comprises the logical channels shown in FIG. 8. The DCC logical channels include: a broadcast control channel (BCCH), comprising a fast broadcast control channel F-BCCH, an extended broadcast control channel E-BCCH, and a broadcast short-message-service control channel S-BCCH; a short-message-service/paging/access channel SPACH, comprising a point-to-point short-message-service channel (SMSCH), the paging channel (PCH), and an access response channel (ARCH); the random access control channel (RACH); and the reserved channel. The DCC slots can be organized into higher level structures called superframes as illustrated in FIG. 5, or as preferably illustrated in FIG. 9, which depicts the frame structure of a forward (base station to mobile station) DCC and shows two successive hyperframes, each of which preferably comprises a respective primary superframe and a respective secondary superframe.

Figure 9:
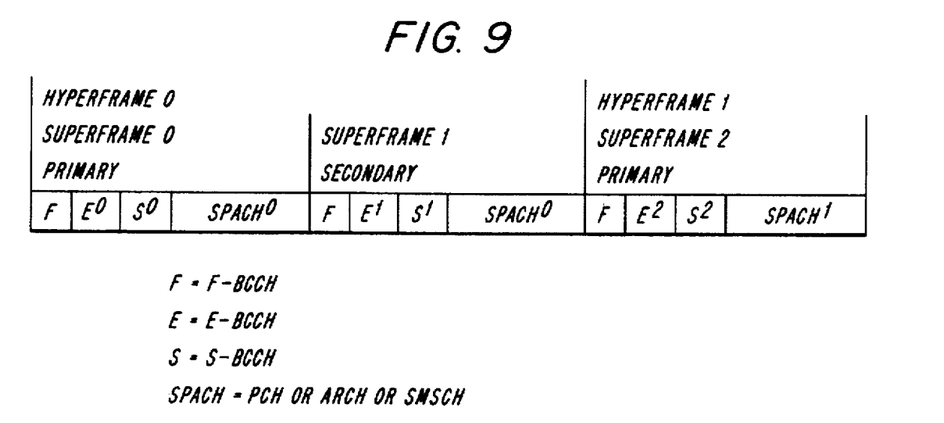
FIG. 9 shows a hyperframe structure.

Three successive superframes are illustrated in FIG. 9, each comprising a plurality of time slots that are organized as the logical channels F-BCCH, E-BCCH, S-BCCH, and SPACH. In general, one or more DCC slots may be allocated for each logical channel in the superframe. Each superframe in a forward DCC preferably includes a complete set of F-BCCH information (i.e., a set of layer 3 messages), using as many slots as are necessary, and each superframe preferably begins with a F-BCCH slot. After the F-BCCH slot or slots, the remaining slots in each superframe include one or more (or no) slots for the E-BCCH, S-BCCH, and SPACH logical channels.

The BCCH, which in the example shown in FIG. 5 is allocated six DCC slots, carries overhead messages. One of the overhead messages is used to define the end of the BCCH section within the superframe. The PCH, which is allocated one DCC slot, carries paging messages. The ARCH, which is also allocated one DCC slot, carries channel assignment and other messages. The exemplary superframe of FIG. 5 may contain other logical channels, including additional paging channels, as indicated by FIG. 9. If more than one PCH is defined, different groups of mobile stations identified by different traits may be assigned to different PCHs.

The BCCH acronym is used to refer collectively to the F-BCCH, E-BCCH, and S-BCCH logical channels. These three logical channels are used, in general, to carry generic, system-related information. The attributes of these three channels are that they are unidirectional (downlink), shared, point-to-multipoint, and unacknowledged. The fast BCCH is a logical channel used to broadcast time critical system information. The extended BCCH is a logical channel used to broadcast system information that is less critical than the information sent on the F-BCCH. The broadcast short message service S-BCCH is a logical channel that is used to broadcast short messages used for an SMS broadcast service.

The SPACH channel is a logical channel that is used to send information to specific mobile stations regarding SMS point-to-point, paging and to provide an access response channel. The SPACH channel may be considered to be further subdivided into three logical channels: SMSCH, ARCH, and PCH. The paging channel PCH is a subset of the SPACH dedicated to delivering pages and orders. The access response channel ARCH is a subset of the SPACH to which the mobile station autonomously moves upon successful completion of an access on the random access channel. The ARCH may be used to convey analog voice channel or digital traffic channel assignments or other responses to the mobile access attempt. The SMS point-to-point channel SMSCH is used to deliver short messages to specific mobile stations receiving SMS services, although the messages could also be addressed to more than one mobile. Similarly, the paging messages on the PCH may also be directed to more than one mobile. The SPACH is unidirectional (downlink), shared, and unacknowledged. The PCH is generally point-to-multipoint, in that it can be used to send paging messages to more than one mobile station, but in some circumstances the PCH is point-to-point. The ARCH and SMSCH are generally point-to-point, although messages sent on the ARCH can also be addressed to more than one mobile station.

For communication from the mobile stations to the base stations, the reverse (uplink) DCC comprises a random access channel RACH, which is used by the mobiles to request access to the system. The RACH logical channel is unidirectional, shared, point-to-point, and acknowledged. All time slots on the uplink are used for mobile access requests, either on a contention basis or on a reserved basis. Reserved-basis access is described in U.S. patent application Ser. No. 08/140,467, entitled "Method of Effecting Random Access in a Mobile Radio System", which was filed on Oct. 25, 1993, and which is incorporated in this application by reference. One feature of RACH operation is that reception of some downlink information is required, whereby mobile stations receive real-time feedback for every burst they send on the uplink. This is known as Layer 2 ARQ, or automatic repeat request, on the RACH, and may be provided by a flow of information called shared channel feedback on a downlink sub-channel.

It may be important sometimes to be able to distinguish between the BCCH slots and the SPACH slots within a superframe. For example, upon being switched on, a mobile station does not know which slots are BCCH slots and which slots are SPACH slots. The mobile station needs to find the overhead information at the beginning of the BCCH section to be able to determine its paging slot. Also, the boundary between the BCCH section and the SPACH section may have changed for a variety of reasons. For example, if a system has been using twelve slots of a thirty-two-slot superframe for the BCCH and wants to use thirteen slots for the BCCH, mobile stations assigned to the first paging slot after the BCCH slots must be informed that they should monitor another paging slot.

According to one aspect of the present invention, one way to distinguish between BCCH slots and SPACH slots is to use different cyclic redundancy check (CRC) bits in these channels. For example, the CRC bits in the Layer 2 frames sent in the BCCH slots may be inverted, while the check bits in the Layer 2 frames sent in the SPACH slots are not inverted. Thus, when a mobile reads the CRC bits, it obtains an indication of the kind of slot it has read. Using the check bits in this way is advantageous in some situations where it is necessary to re-assign a mobile station to another paging slot. The mobiles could obtain this information by decoding one or two bits that would identify the type of slot being decoded, but at a cost of reduced bandwidth. In Applicants' system, the mobile stations will recognize that something has changed when they spot the inverted CRC bits, and in response they will re-read the F-BCCH, including the new DCC structure and paging slot assignment.

Furthermore, as illustrated in FIG. 8, the DCC logical channels may include reserved channels that make the communication system more flexible: new features, services, or functions can be added at a later time without affecting existing mobiles. According to this embodiment of the present invention, the BCCH overhead messages include a field which indicates where the reserved channels are located in the superframe. These reserved channels have a potentially wide variety of uses, such as carrying messages specific to a system operator and/or mobile station manufacturer. While existing mobile stations may not be able to use the new features described in the reserved channels, the existing mobile stations will take the location and number of reserved slots into consideration when determining the location of their respective paging channels.

Figure 10A:
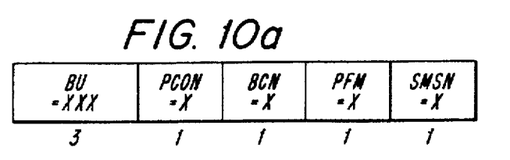
FIGS. 10a–10o illustrate various SPACH layer 2 protocol frames according to one embodiment of the present invention.

The SPACH layer 2 protocol is used whenever a TDMA burst, or time slot, is used to carry point-to-point SMS, paging, or ARCH information. A single SPACH layer 2 protocol frame is constructed so as to fit within a 125-bit envelope. An additional five bits are reserved for use as tail bits, resulting in a total of 130 bits of information carried within each slot assigned for SPACH purposes. FIGS. 10a–10o show a range of possible SPACH layer 2 protocol frames under various conditions. A summary of the possible SPACH formats is provided in the first table below. A summary of the fields comprising layer 2 protocol frames for SPACH operation is provided in the second table below.

Similar frame formats are used for all SPACH channels such that all frames have a common Header A. The contents of the Header A determine whether or not a Header B is present in any given SPACH frame. The Header A discriminates among hard page frames (containing no layer 3 information), PCH frames, ARCH frames and SMSCH frames. A Hard Triple Page frame containing three 34-bit mobile station identifications (MSIDs) can be sent on the PCH (burst usage (BU)=Hard Triple Page). A Hard Quadruple Page frame containing four 20-bit or 24-bit MSIDs can be sent on the PCH (BU=Hard Quadruple Page).

One or more L3 messages may be transmitted in one frame, or continued over many frames. It is currently preferred that MSIDs are only carried within frames where BU=PCH, ARCH or SMSCH with the burst type (BT)= Single MSID, Double MSID, Triple MSID, Quadruple MSID, or automatic retransmission request ARQ Mode BEGIN. The mobile station identity type IDT field identifies the format of all MSIDs carried within a given SPACH frame (i.e., no mixing of MSID formats is allowed). Pages carried on the PCH are preferably not allowed to continue beyond a single SPACH frame, although the protocol allows for it. All other PCH messages may continue beyond a single SPACH frame.

For non-ARQ-mode operation, the L2 SPACH protocol supports sending a single L3 message to multiple MSIDs in addition to the fixed one-to-one relationship between MSIDs and L3 messages. A Message Mapping field (MM) is used to control this aspect of the layer 2 frame operation. A valid SPACH frame requires that all L2 header information pertinent to a given L2 frame be included entirely within that frame, i.e., the L2 header from a given SPACH frame cannot wrap into another SPACH frame. An Offset Indicator field (OI) is used to allow both the completion of a previously started layer 3 message and the start of a new layer 3 message to occur within a single SPACH frame.

The following table summarizes the possible SPACH formats:

|  | SMS | PCH | ARCH | CAN BE CONTINUED |
| --- | --- | --- | --- | --- |
| Single MSID | Y | Y | Y | Y |
| Double MSID | N | Y | Y | Y |
| Triple MSID | N | Y | Y | Y |
| Quadruple MSID | N | Y | Y | Y |
| Hard Triple Page (MIN) | N | Y | N | N |
| Hard Quadruple Page (MINI) | N | Y | N | N |
| Continue | Y | Y | Y | Y |
| ARQ Mode BEGIN | Y | N | Y | Y |
| ARQ Mode CONTINUE | Y | N | Y | Y |
| Group ID | Y | Y | Y | Y |

FIG. 10a illustrates the SPACH Header A according to one embodiment of the present invention. The SPACH Header A contains burst usage (BU) information and flags for managing mobile stations in a sleep mode. The BU field provides a high-level indication of burst usage. According to the present invention, the operation performed on each SPACH channel is not predetermined. The BU field indicates whether the burst is being used for paging, access response, or short message services. The flags indicate changes in sleep mode configuration as well as in broadcast control channel information. This header is always present in all possible SPACH frame types.

Figure 10B:
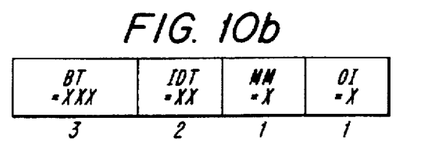

FIG. 10b illustrates the SPACH Header B according to one embodiment of the present invention. The SPACH Header B contains supplementary header information used to identify the remaining contents of the layer 2 frame. This header is present when Header A indicates a burst usage of type PCH, ARCH or SMSCH. In one alternative, the bit used for the offset indicator OI shown in FIG. 10b as part of the Header B may be used as a SPACH response mode SRM indicator, i.e., as information about the layer 2 access mode (contention or reservation) to be used in the next access attempt made by the receiving mobile station. The SRM indicator indicates how a mobile is to respond once it has received all frames associated with a given SPACH message.

Figure 10C:
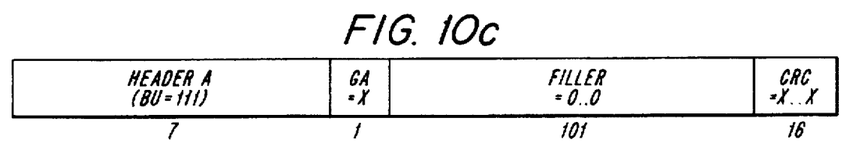

FIG. 10c illustrates a Null Frame. The Null frame is sent when necessary by the cellular system when there is nothing else to be transmitted for any given SPACH burst. The Null Frame also contains a Go Away GA flag which will be described below.

Figure 10D:
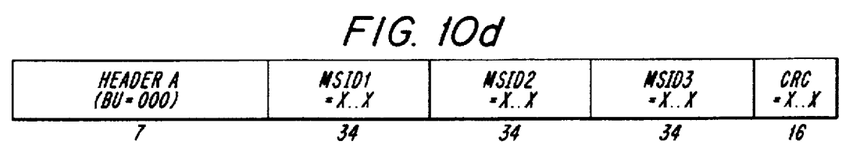
Figure 10E:
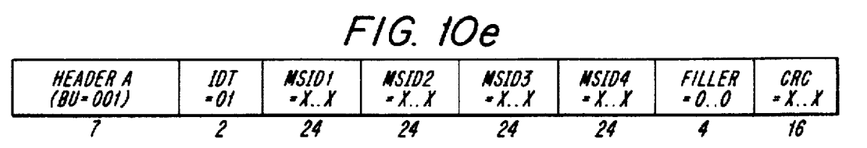

FIGS. 10d, 10e illustrate a Hard Triple Page Frame and a Hard Quadruple Page Frame. A Hard Triple Page is a single frame page message containing three 34-bit MINs. A Hard Quadruple Page is a single frame page message containing four 20-bit or 24-bit MINs as determined by the mobile station identity type.

Figure 10F:
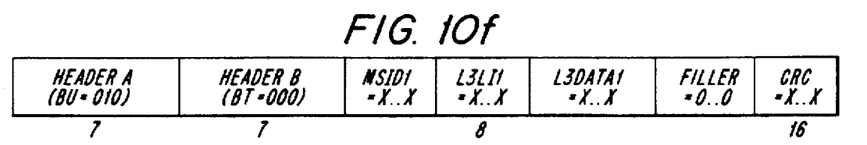

A Single MSID frame, as illustrated in FIG. 10f, is used for starting the delivery of ARCH or SMSCH L3 messages in a non-ARQ mode. In addition, this frame may also be used for sending L3 PCH messages (pages or otherwise), which are non-ARQ by definition. Page messages sent using a Single MSID frame cannot be continued into another frame.

If an ARCH or SMSCH L3 message is too long to fit into a Single MSID frame then the remaining L3 information is carried using additional CONTINUE frames or MSID frames as necessary. If a complete ARCH or SMSCH L3 message does fit within a Single MSID frame, it is padded with filler, i.e., bits having a predetermined value like zero, as necessary.

Figure 10G:
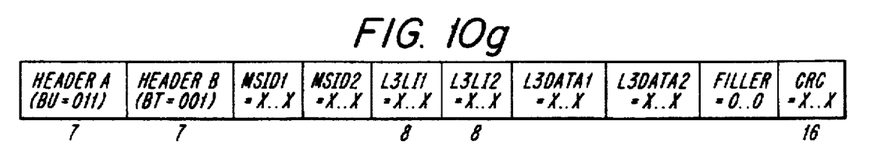
Figure 10H:
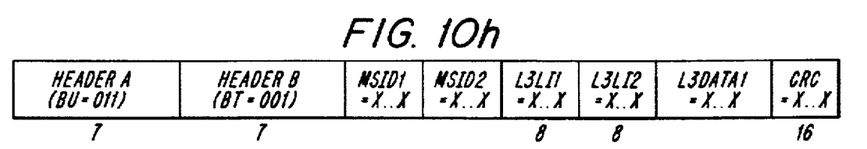
Figure 10I:
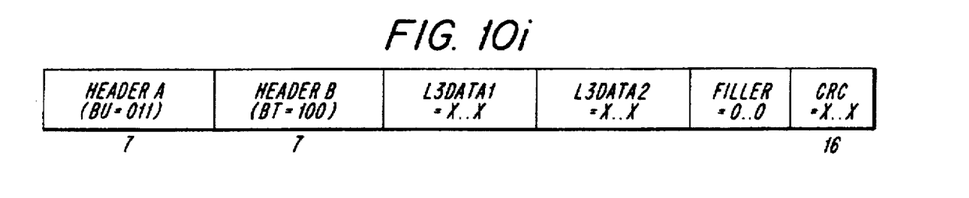
Figure 10J:
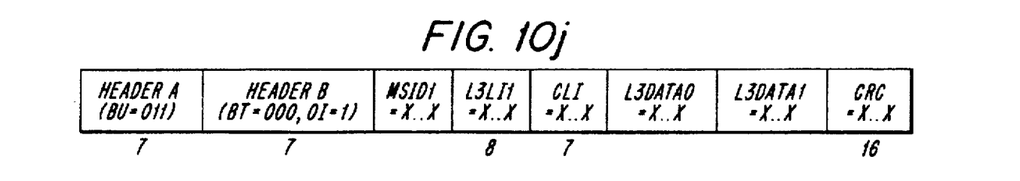

If a non-page PCH L3 message is too long to fit into Single MSID frame then the remaining L3 information is carried using additional CONTINUE frames or MSID frames as necessary. If a complete PCH L3 message does fit within a Single MSID frame, it is padded with FILLER as necessary. A Double MSID frame, as illustrated in FIG. 10g, is used for starting the delivery of two ARCH messages in a non-ARQ mode or two PCH L3 messages. The number of MSIDs is indicated in the BT field with the same IDT format used for both instances of MSID. Page messages sent using a Double MSID frame cannot be continued into another frame. FIG. 10h shows a Double MSID frame with continuation. FIG. 10i shows a CONTINUE frame. FIG. 10j shows an Offset Single MSID frame.

Figure 10K:
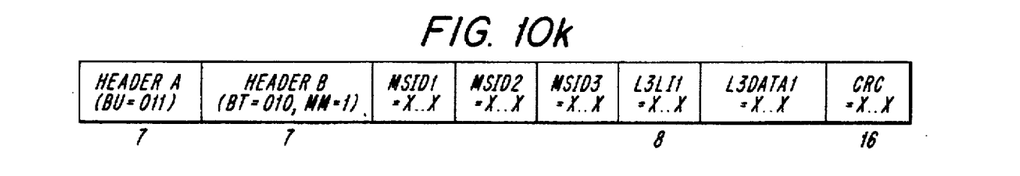

A Triple MSID frame, as illustrated in FIG. 10k, is used for starting the delivery of three ARCH L3 messages in a non-ARQ mode or three PCH L3 messages. The number of MSIDs is indicated in the BT field with the same mobile station identity type format used for all instances of MSID. Page messages sent using a Triple MSID frame cannot be continued into another frame. A Quadruple MSID frame is used for starting the delivery of four ARCH L3 messages in non ARQ mode or four PCH L3 messages. The number of MSIDs is indicated in the BT field with the same mobile station identity type format used for all instances of MSID. Page messages sent using a Quadruple MSID frame cannot be continued into another frame.

Figure 10L:
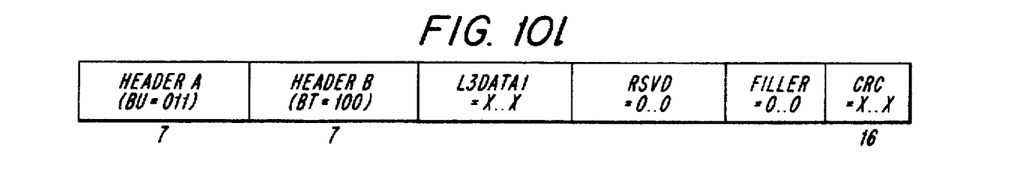

A CONTINUE frame, as illustrated in FIG. 10l, is used for continuation of the L3 messages which are too long to fit into the previous frame. Note that a L2 header which is specific to any given SPACH frame must always be carried entirely within that frame (i.e., the L2 header associated with a given SPACH frame is not completed by using a subsequent SPACH frame).

Figure 10M:
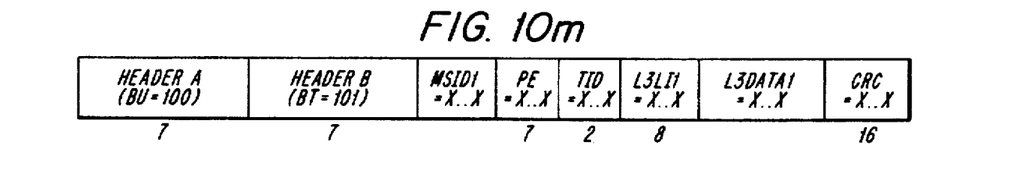

An ARQ Mode BEGIN frame, as illustrated in FIG. 10m, is used for starting the delivery of a L3 ARCH or SMSCH message in the ARQ mode. The ARQ Mode BEGIN frame contains only one MSID within its L2 header as well as a portion of the L3 message itself. If the L3 message is too long to fit into a single ARQ Mode BEGIN frame, then the remaining L3 information is carried using additional ARQ Mode CONTINUE frames as necessary. If the L3 message does fit within a single ARQ Mode BEGIN frame, it is padded with filler as necessary.

The PE field in conjunction with the transaction identifies TID field identifies the transaction initiated by the ARQ Mode BEGIN frame and serves to associate any subsequent ARQ Mode CONTINUE frames with this same transaction. An ARQ Mode BEGIN frame has an implicit frame number FRNO value of zero associated with it.

Figure 10N:
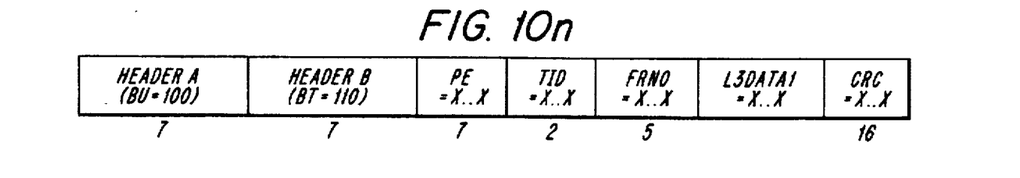
Figure 10O:
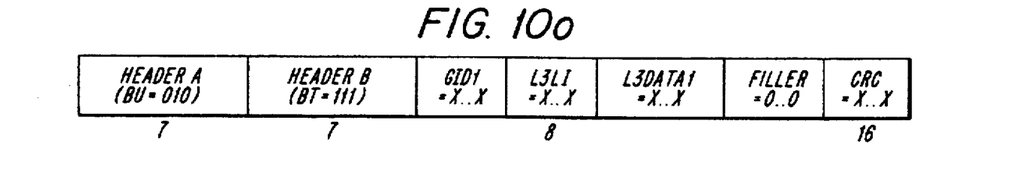

The ARQ Mode CONTINUE frame, as illustrated in FIG. 10n, is used for continuing a L3 ARCH or SMSCH message which is too long to fit into the previous ARQ Mode frame (BEGIN or CONTINUE). The frame number FRNO field identifies the CONTINUE frames within the context of the overall L3 message. The FRNO field value is incremented for each CONTINUE frame sent in support of a given transaction (i.e., multiple CONTINUE frames may be sent to complete the transaction initiated by the ARQ Mode BEGIN frame). The ARQ Mode Continue frame is also used to repeat any previously sent ARQ Mode CONTINUE frames received incorrectly by the mobile station.

According to one embodiment of the present invention, a group identity field (GID) can be included in the SPACH layer 2 protocol. The group identity field indicates that a mobile is part of a group. By using this group identity, the communication system can page the entire group using one page. A Group ID frame is illustrated in FIG. 10o. The Group ID frame is used for starting the delivery of ARCH or SMSCH L3 messages in a non-ARQ mode. In addition, this frame may also be used for sending L3 PCH messages (pages or otherwise), which are non-ARQ by definition. Page messages sent using a Group ID frame cannot be continued into another frame. If an ARCH or SMSCH L3 message or a non-page PCH L3 message is too long to fit into a Group ID frame, then the remaining L3 information is carried using an END frame or additional CONTINUE frames as necessary. If a complete ARCH or SMSCH L3 message or a non-page PCH L3 message does fit within a Group ID frame, it is padded with filler as necessary.

According to another embodiment of the present invention, a go-away flag GA can be included in the SPACH layer 2 protocol for example in the Null Frame illustrated in FIG. 10c. The GA flag can be used by the cellular system to indicate that the mobile stations should not attempt to use a certain cell. Fir example, this would permit a system operator to test a base station without risk of mobile stations trying to lock onto it.

The following table summarizes the SPACH Layer 2 Protocol fields:

| Field Name | Length (bits) | Values |
|---|---|---|
| BU = Burst Usage | 3 | 000 = Hard Triple Page (34 bit MSID)<br>001 = Hard Quad Page (20 or 24 bit MSID)<br>010 = PCH Burst<br>011 = ARCH Burst<br>100 = SMSCH Burst<br>101 = Reserved<br>110 = Reserved<br>111 = Null |
| PCON = PCH Continuation | 1 | 0 = No PCH Continuation<br>1 = PCH Continuation, Activated |
| BCN = BCCH Change Notification | 1 | Transitions whenever there is a change in F-BCCH information. |
| SMSN = SMS Notification | 1 | Transitions whenever there is a change in S-BCCH information. |
| PFM = Paging Frame Modifier | 1 | 0 = Use assigned PF<br>1 = Use one higher than assigned PF |
| BT = Burst Type | 3 | 000 = Single MSID Frame<br>001 = Double MSID Frame<br>010 = Triple MSID Frame<br>011 = Quadruple MSID Frame<br>100 = Continue Frame<br>101 = ARQ Mode Begin<br>110 = ARQ Mode Continue<br>111 = Reserved |
| IDT = Identity Type | 2 | 00 = 20 bit TMSI<br>01 = 24 bit MINI per IS-54B<br>10 = 34 bit MIN per IS-54B<br>11 = 50 bit IMSI |
| MSID = Mobile Station Identity | 20/24/34/50 | 20 bit TMSI<br>24 bit MINI<br>34 bit MIN<br>50 bit IMSI |
| GID = Group Identity | 24/34/50 | 24 bit MIN 1<br>34 bit MIN<br>50 bit IMSI |
| MM = Message Mapping | 1 | 0 = One instance of L3LI and L3DATA per irstance of MSID.<br>1 = One instance of L3LI and L3DATA for multiple MSIDs. |
| OI = Offset Indicator | 1 | 0 = No message offset included.<br>1 = Message offset included. |
| or<br>SRM = SPACH Response Mode | | 0 = Next access attempt made on RACH to be contention-based.<br>1 = Next access attempt made on RACH to be reservation-based; |
| CLI = Continuation Length Indicator | 7 | Number of bits remaining in the previous L3 message. |
| GA = Go Away | 1 | Indicates if the cell is barred |

-continued

| Field Name | Length (bits) | Values |
|---|---|---|
| | | 0 = cell not barred |
| | | 1 = cell barred |
| L3LI = Layer 3 Length Indicator | 8 | Variable length layer 3 messages supported up to a maximum of 255 octets. |
| L3DATA = Layer 3 Data | Variable | Contains a portion (some or all) of the layer 3 message having an overall length as indicated by L3LI. The portion of this field not used to carry layer 3 information is filled with zeros. |
| PE = Partial Echo | 7 | The 7 least significant bits of the mobile station IS-54B MIN. |
| TID = Transaction Identity | 2 | Indicates which ARQ mode transaction is being transmitted on the ARCH or SMSCH. |
| FRNO = Frame Number | 5 | Uniquely identifies specific frames sent in support of an ARQ mode transaction. |
| FILLER = Burst Filler | Variable | All filler bits are set zero. |
| CRC = Cyclic Redundancy Code | 16 | Same Generator polynomiai as IS-54B (includes DVCC) |

According to the present invention, the mobile station can be in any of a plurality of states. For example, a mobile station would be in a "start random access" state before the first unit of a message that is to be transmitted by a random access has been transmitted. The mobile station would be in a "start reserved access" state before the first unit of a message that is to be transmitted by a reservation-based access has been transmitted. The mobile station would be in a "more units" state if there are more units associated with the same access event pending for transmission. The mobile station would be in a "after last burst" state if the last unit of an access event has been transmitted. Finally, the mobile station would be in a "success" state after a message has been sent successfully.

Figure 11:
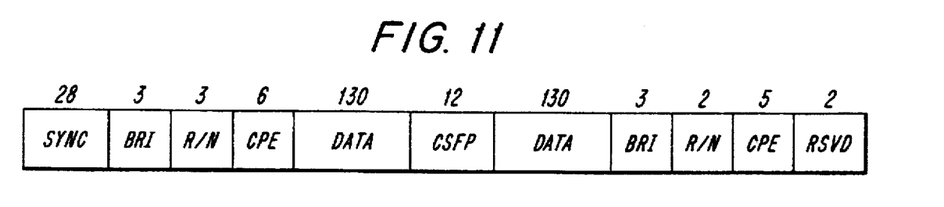
FIG. 11 shows an exemplary slot format on the forward DCC.

The layer 2 protocol also provides for a plurality of flags. Forward shared control feedback (SCF) flags are used to control the reverse channel, i.e., the RACH, as noted above. These SCF flags are a BRI flag, a PUN flag, and a CPE flag that are interleaved and transmitted in two fields in each downlink slot (layer 1); the total length of the two fields is twenty-two bits. A preferred information format in the slots of the forward DCC is shown in FIG. 11. This format is substantially the same as the format used for the DTCs under the IS-54B standard, but new functionalities are accorded to the fields in each slot in accordance with Applicants' invention. In FIG. 11, the number of bits in each field is indicated above that field. The bits sent in the SYNC field are used in a conventional way to help ensure accurate reception of the CSFP and DATA fields, and the SYNC field would be the same as that of a DTC according to IS-54B and would carry a predetermined bit pattern used by the base stations to find the start of the slot. The CSFP field in each DCC slot conveys a coded superframe phase (SFP) value that enables the mobile stations to find the start of each superframe.

The busy/reserved/idle (BRI) flag is used to indicate whether the corresponding uplink RACH slot is Busy, Reserved or Idle for reserved-basis accesses, which is described in U.S. patent application Ser. No. 08/140,467. Six bits are used for these flags and the different conditions are encoded as shown in the table below:

| | $BRI_5$ | $BRI_4$ | $BRI_3$ | $BRI_2$ | $BRI_1$ | $BRI_0$ |
|---|---|---|---|---|---|---|
| Busy | 1 | 1 | 1 | 1 | 0 | 0 |
| Reserved | 0 | 0 | 1 | 1 | 1 | 1 |
| Idle | 0 | 0 | 0 | 0 | 0 | 0 |

The received/not received (R/N) flag is used to indicate whether or not the base station received the last transmitted burst. A five-times repetition code is used for encoding this flag as shown in the table below:

| | $R/N_4$ | $R/N_3$ | $R/N_2$ | $R/N_1$ | $R/N_0$ |
|---|---|---|---|---|---|
| Received | 1 | 1 | 1 | 1 | 1 |
| Not Received | 0 | 0 | 0 | 0 | 0 |

According to the present invention, partial echo information is used to identify which mobile station was correctly received after the initial burst of random access and/or which mobile station is intended to have access to the reserved slot. For example, the seven least significant bits of an IS-54B-type MIN can be assigned as the partial echo information, and these are preferably encoded in a manner similar to the manner in which the digital verification color code (DVCC) is encoded under IS-54B, i.e., a (12,8) code, producing eleven bits of coded partial echo information.

The following table shows how the mobile decodes received flags according to the layer 2 state. Note that only the flags relevant to the layer 2 state are shown. In the "start random access" state, the BRI flag is the only relevant flag. During a multiburst message transmission, both the BRI and R/N flags are relevant. In the summary in the following table, $b_i$ is the bit value.

| Layer 2 State | Busy/Reserved/Idle | | | Received/Not Received | |
| --- | --- | --- | --- | --- | --- |
| | Busy | Reserved | Idle | Received | Not received |
| | 111100 | 001111 | 000000 | 11111 | 00000 |
| Start random access | | Idle IF $\sum_{i=1}^{4} b_i < 2$ AND $\sum_{i=3}^{6} b_i < 2$ | | N/A | N/A |
| Start reserved access | | Reserved IF < 3 bits difference to Reserved flag code value | | N/A | N/A |
| More units | Busy IF < 4 bits difference to Busy flag code value | | | $\sum_{i=1}^{5} b_i \geq 4$ | $\sum_{i=1}^{5} b_i < 4$ |
| After last burst | Busy IF < 4 bits difference to Busy flag code value | | | $\sum_{i=1}^{5} b_i \geq 4$ | $\sum_{i=1}^{5} b_i < 4$ |

The mobile station interprets a received coded partial echo value as having been correctly decoded if it differs by less than three bits from the correct coded partial echo (CPE). This is referred to as PE match.

A mobile station is allowed a maximum of Y+1, where Y=(0, 1, . . . , 7), transmission attempts before considering the attempt to transfer a message as a failure. The random delay period used in the mobile station after a Not Idle condition or after a transmission attempt is uniformly distributed between zero msec and 200 msec with a granularity of 6.667 msec (the duration of a time slot). A mobile station is preferably not allowed to make more than Z consecutive repetitions of an individual burst, where Z=(0, 1, . . . , 3).

According to one embodiment of the present invention, the BMI (base station, mobile switching center and interworking function) can page a mobile station by using SPACH Notification and thereby save much system bandwidth in some situations. For example, when a SPACH message is to be delivered to a mobile in the system illustrated in FIG. 1, all ten base stations would transmit it since the system would generally not know in which cell the mobile was located. If the SPACH message required a total of ten slots to transmit, 100 slots would be used by the system to send the SPACH message, ten slots per base station.

To avoid this waste, a SPACH Notification message would be broadcast in all ten cells, or whatever the appropriate number of cells for the mobile station happened to be, rather than the entire SPACH message. In essence, the SPACH Notification message asks the mobile station if it is able to receive a message. When the mobile station responds (on the RACH), the BMI can determine in which cell the mobile station is located and thus can send the SPACH message through that cell's base station.

In addition, the SPACH Notification message may also indicate what type of SPACH message will be sent to the mobile station. For example, if the mobile station receives a SPACH Notification which indicates that an SSD (Shared Secret Data) Update is coming, the mobile station issues a response containing a SPACH confirmation and starts a timer. The BMI then transmits the SSD Update Order message. Upon receipt of the message, the mobile stops the timer and enters the SSD Update Proceeding State. However, if the timer expires prior to receiving the SSD Update Order message, the mobile returns to the DCCH camping state. The SPACH Notification could also be used to notify the mobile that a SMS message is coming.

In another aspect, the system may dynamically assign temporary mobile station identities (TMSIs) to the mobile stations. Such a TMSI would be a 20-bit or 24-bit MSID sent by the system over the air interface to a mobile. The TMSI would be used by the network to page or deliver a message to the corresponding mobile station on the SPACH, and the TMSI would be used by the mobile station to make accesses on the RACH.

Using 20-bit TMSIs increases the paging capacity in comparison to using 24-bit TMSIs at the expense of reducing the address space, i.e. , the number of mobiles that can be paged, in the same way that using 24-bit MSIDs increases paging capacity in comparison to using 34-bit MINs (compare FIG. 10e to FIG. 10d, for example). As seen from FIG. 10e, a single layer 2 paging frame can carry five 20-bit TMSIs, or pages, instead of four 24-bit TMSIs (or MSIDs). By providing a plurality of TMSI formats, one has the flexibility to trade off address space for paging capacity.

It is currently preferred that the BMI assign a TMSI to a mobile in response to the mobile's registration, in which case the TMSI can be provided in an information element called MSID Assignment that is included in a Registration Accept message sent on the SPACH. Advantageously, the mobile station would treat the assigned TMSI as valid until it is switched off or until it decides to carry out any of the following system accesses: a new system registration; a forced registration; a power-up registration; a TMSI timeout registration; a deregistration registration; or the first system access of any kind made after receiving various other messages, such as a registration reject message. A mobile station assigned a TMSI in a registration accept message sent by the BMI using ARQ mode advantageously would only treat the assigned TMSI as valid if the ARQ transaction were completed successfully from a layer 2 perspective.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

We claim:

1. A method for discriminating between a broadcast control channel and short-message-service/paging/access channels, SPACH channels, in a superframe in a cellular communication system with a layer 2 protocol, comprising the steps of:

assigning a first cyclic redundancy check to SPACH frames; and assigning a second cyclic redundancy check to broadcast control channel frames, wherein a mobile station distinguishes between said SPACH and broadcast control channel frames by examining said cyclic redundancy checks, wherein said second cyclic redundancy check is said first cyclic redundancy check inverted.

2. A mobile station for use in a cellular communication system, comprising:

means for receiving signals from said cellular system, wherein a plurality of frames are contained within said signals; and     means for distinguishing between different types of frames by examining cyclic redundancy checks assigned to each frame by said cellular system, wherein a first cyclic redundancy check is assigned to SPACH frames and a second cyclic redundancy check is assigned to broadcast control channel frames, and said second cyclic redundancy check is said first cyclic redundancy check inverted.

3. A cellular communication system with a plurality of mobile stations and at least one base station, comprising:

means for assigning different cyclic redundancy checks to different types of frames;

means for transmitting a plurality of different frames using a layer 2 protocol to said mobile stations, wherein said mobile stations distinguish between said different frames by examining said cyclic redundancy checks, wherein a first cyclic redundancy check is assigned to SPACH frames and a second cyclic redundancy check is assigned to broadcast control channel frames, and said second cyclic redundancy check is said first cyclic redundancy check inverted.

* * * * *